US009032495B2

(12) United States Patent
Zhang

(10) Patent No.: US 9,032,495 B2
(45) Date of Patent: May 12, 2015

(54) ONLINE USER ACCOUNT LOGIN METHOD AND A SERVER SYSTEM IMPLEMENTING THE METHOD

(71) Applicant: Tencent Technology (Shenzhen) Company Limited, Shenzhen, Guangdong Province (CN)

(72) Inventor: Xiaolong Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 15 days.

(21) Appl. No.: 13/900,468

(22) Filed: May 22, 2013

(65) Prior Publication Data

US 2014/0033286 A1    Jan. 30, 2014

(30) Foreign Application Priority Data

Jul. 27, 2012   (CN) .......................... 2012 1 0264146

(51) Int. Cl.
*H04L 29/06* (2006.01)
(52) U.S. Cl.
CPC .............. *H04L 63/08* (2013.01); *H04L 63/083* (2013.01); *H04L 63/18* (2013.01)
(58) Field of Classification Search
CPC ........ H04L 63/083; H04L 63/18; H04L 63/08
USPC .......................................................... 726/7
See application file for complete search history.

(56) References Cited

U.S. PATENT DOCUMENTS

| | | | |
|---|---|---|---|
| 8,024,576 B2 * | 9/2011 | Gargaro et al. ............... 713/183 |
| 8,627,438 B1 * | 1/2014 | Bhimanaik ....................... 726/9 |
| 2009/0288159 A1 * | 11/2009 | Husemann et al. ............. 726/16 |
| 2010/0299163 A1 * | 11/2010 | Kang et al. ......................... 705/5 |
| 2011/0026716 A1 * | 2/2011 | Tang et al. ..................... 380/284 |
| 2013/0152176 A1 * | 6/2013 | Courtney et al. .................. 726/5 |
| 2013/0173915 A1 * | 7/2013 | Haulund ........................ 713/159 |
| 2013/0179692 A1 * | 7/2013 | Tolba et al. .................... 713/179 |
| 2013/0254858 A1 * | 9/2013 | Giardina et al. ................... 726/7 |

* cited by examiner

*Primary Examiner* — Michael Pyzocha
(74) *Attorney, Agent, or Firm* — Morgan, Lewis & Bockius LLP

(57) ABSTRACT

The present invention provides a webpage login method involving two client devices and a server. The server receives an information access request from a first client device. In response to the information access request, the server generates a unique identifier and returns the unique identifier to the first client device. The unique identifier is to be displayed on the first client device. Next, the server receives a first message from a second client device, the first message including user account information at the server system and authentication information. The server determines whether the authentication information corresponds to the unique identifier generated by the server system. If the authentication information corresponds to the unique identifier, the server authenticates the information access request such that the user can access information at the server and associated with the user account information from the first client device.

17 Claims, 5 Drawing Sheets

US 9,032,495 B2

ONLINE USER ACCOUNT LOGIN METHOD AND A SERVER SYSTEM IMPLEMENTING THE METHOD

RELATED APPLICATION

This application claims priority to Chinese Patent Application No. 201210264146.8, entitled "AN ONLINE USER ACCOUNT LOGIN METHOD AND A SERVER SYSTEM IMPLEMENTING THE METHOD," filed on Jul. 27, 2012, which is incorporated by reference in its entirety.

TECHNICAL FIELD

The disclosed implementations relate generally to the field of Internet technologies, and in particular, to an online user account login method and a server system implementing the method.

BACKGROUND

With the growing popularity of Internet applications, the requirements for Internet functions become higher and higher, and a user expects to use the Internet conveniently and fast.

In the prior art, when logging in to a web page on a computer, a user is usually required to input an account and a password. After a backend server authenticates that the account and the password input by the user match, page login of the account is implemented on the computer.

If a user has logged in with a same account and password on another terminal (for example, a mobile phone) and still has to input the same account and password on a computer to log in, this becomes very inconvenient.

Taking WeChat as an example, in the existing technology of WeChat, a user downloads WeChat on a mobile phone and registers an account and a password, and a WeChat server records the registered account and password. When the user inputs the account and the password on the mobile phone to log in, the WeChat server determines whether the account and password input by the user match, and if yes, enables the user to log in to the input account of WeChat.

However, to log in to WeChat on a computer at this time, the user also needs to input the account and password, which can be easily taken advantage of by some phishing programs, thereby affecting the security of the account. Also, to log in on a computer with the same account and password as those on a mobile phone, the operation of a user becomes very inconvenient due to repeated input.

It is one of the research trends in the field of Internet technologies on how to guarantee the security of an account and also facilitate the operation of a user during page login on a display terminal.

SUMMARY

An objective of the present invention is to provide a page login method, so as to guarantee the security of an account and facilitate the operation of a user during page login on a display terminal.

In order to achieve the foregoing beneficial effects, the present invention is directed to a page login method, which includes the following steps:

receiving, by a server, a login instruction input by a user, and performing login of an account corresponding to the login instruction on an application module of a scanning terminal, where the scanning terminal includes a scanning module; and determining, by the server, whether an identification code displayed on a display terminal is scanned by the scanning terminal corresponding to the account, and if yes, implementing page login of the account on the display terminal.

In an implementation of the present invention: the identification code includes an authentication identifier; and the step of determining, by the server, whether an identification code displayed on a display terminal is scanned by the scanning terminal corresponding to the account specifically includes:

receiving, by the server, scanning information sent by the scanning terminal, where the scanning information is generated by the scanning terminal scanning the identification code, and the scanning information includes a one-to-one mapping between the account and the authentication identifier in the identification code; and searching, by the server, the received scanning information to determine whether an authentication identifier corresponding to the identification code is found; and if yes, determining that the identification code is scanned.

In an implementation of the present invention: before the step of searching, by the server, the received scanning information for the authentication identifier corresponding to the identification code, the method further includes a step:

presetting, by the server, a search interval, periodically searching the received scanning information according to the search interval, and determining whether the authentication identifier corresponding to the identification code exists in the received scanning information.

In an implementation of the present invention: the step of implementing, by the server, page login of the account on the display terminal specifically includes:

acquiring, by the server, from the scanning information, an account corresponding to the authentication identifier, and implementing page login of the account on the display terminal.

In an implementation of the present invention: before the step of determining, by the server, whether an identification code displayed on a display terminal is scanned by the scanning terminal corresponding to the account, the method further includes the following step:

receiving, by the server, a page login request sent by the display terminal, generating the identification code according to the page login request, and sending the identification code to the display terminal.

In an implementation of the present invention: the step of generating the identification code according to the page login request further includes:

receiving, by the server, a page access request sent by the display terminal, assigning the authentication identifier to the page access request, and sending the authentication identifier to the display terminal; and receiving, by the server, the page login request sent by the display terminal, where the page login request carries the authentication identifier, and generating the identification code according to the page login request and the authentication identifier, where the identification code includes the authentication identifier.

In an implementation of the present invention: after the server implements page login of the account on the display terminal, the method further includes the following step:

generating, by the server, prompt information, and sending the prompt information to the scanning terminal, so as to display the prompt information on the scanning terminal, where the prompt information is used to prompt the user that page login of the account is performed on the display terminal.

In an implementation of the present invention: the displayed identification code is a 2D code.

Another objective of the present invention is to provide a server, so as to guarantee the security of an account and facilitate the operation of a user during page login on a display terminal.

In order to achieve the foregoing beneficial effects, the present invention is directed to a server, which includes:

a scanning terminal login module, configured to receive a login instruction input by a user, and perform login of an account corresponding to the login instruction on an application module of a scanning terminal, where the scanning terminal includes a scanning module; and a page login module, configured to, after it is determined that an identification code displayed on a display terminal is scanned by the scanning terminal corresponding to the account, implement page login of the account on the display terminal.

In an implementation of the present invention: the identification code includes an authentication identifier, and the server further includes:

a search module, configured to, after scanning information sent by the scanning terminal is received, search the received scanning information, and if the authentication identifier corresponding to the identification code is found, determine that the identification code is scanned, where the scanning information is generated by the scanning terminal scanning the identification code, and the scanning information includes a one-to-one mapping between the account and the authentication identifier in the identification code.

In an implementation of the present invention: the search module is further configured to periodically search the received scanning information according to a preset search interval.

In an implementation of the present invention: the page login module is further configured to acquire, from the scanning information, an account corresponding to the authentication identifier, and implement page login of the account on the display terminal.

In an implementation of the present invention: the server further includes:

an identification code generation module, configured to, after the page login request sent by the display terminal is received, generate the identification code according to the page login request, and send the identification code to the display terminal.

In an implementation of the present invention: the identification code generation module is further configured to, after the page access request sent by the display terminal is received, assign the authentication identifier to the page access request, and send the authentication identifier to the display terminal; and after the page login request sent by the display terminal and the authentication identifier are received, generate the identification code according to the page login request and the authentication identifier.

In an implementation of the present invention: the server further includes:

a prompt information generation module, configured to generate prompt information, and send the prompt information to the scanning terminal, so as to display the prompt information on the scanning terminal, where the prompt information is used to prompt the user that page login of the account is performed on the display terminal.

In an implementation of the present invention: the displayed identification code is a 2D code.

Compared with the prior art, in the present invention, the server receives the login instruction input by the user, and performs login of the account corresponding to the login instruction on the application module of the scanning terminal, where the scanning terminal includes the scanning module; and the server determines whether the identification code displayed on the display terminal is scanned by the scanning terminal corresponding to the account, if yes, implements page login of the account on the display terminal. It is obvious that in the present invention, during page login, not only the operation is simple, the efficiency is high, but also an account and password do not require to be input, thereby guaranteeing the security of the account.

In accordance with some implementations of the present application, a method for authenticating a user's request to access information managed by a server system from a first client device is implemented at the server system, the server system having one or more processors and memory for storing programs to be executed by the one or more processors. The server system receives an information access request from the first client device. In response to the information access request, the server system generates a unique identifier and returns the unique identifier to the first client device. The unique identifier is to be displayed on a display of the first client device. Next, the server system receives a first message from a second client device, the first message including user account information at the server system and authentication information. The server system determines whether the authentication information corresponds to the unique identifier generated by the server system. If the authentication information corresponds to the unique identifier, the server system authenticates the information access request such that the user can access information at the server system and associated with the user account information from the first client device.

In accordance with some implementations of the present application, a server system includes one or more processors; memory; and one or programs stored in the memory for authenticating a user's request to access information managed by the server system from a first client device. The one or more programs, when executed by the one or more processors, causes the server system to: receive an information access request from the first client device; in response to the information access request, generate a unique identifier and return the unique identifier to the first client device, wherein the unique identifier is to be displayed on a display of the first client device; receive a first message from a second client device, wherein the first message includes user account information at the server system and authentication information; determine whether the authentication information corresponds to the unique identifier generated by the server system; and if the authentication information corresponds to the unique identifier generated by the server system, authenticate the information access request such that the user can access information at the server system and associated with the user account information from the first client device.

In accordance with some implementations of the present application, a non-transitory computer readable storage medium stores one or more programs configured for execution by a server system that includes one or more processors and memory storing one or more programs to authenticate a user's request to access information managed by the server system from a first client device. The one or more programs comprising instructions for: receiving an information access request from the first client device; in response to the information access request, generating a unique identifier and returning the unique identifier to the first client device, wherein the unique identifier is to be displayed on a display of the first client device; receiving a first message from a second client device, wherein the first message includes user account information at the server system and authentication information; determining whether the authentication information corresponds to the unique identifier generated by the server system; and if the authentication information corresponds to the unique identifier generated by the server system, authenticating the information access request such that the user can access information at the server system and associated with the user account information from the first client device.

In order to make the content of the present invention clearer and more comprehensible, a preferred implementation is described in detail with reference to the accompanying drawings in the following.

In accordance with some implementations of the present application, a method is performed at a first client device for authenticating a user's request to access information managed by the server system from the first client device, the first client device having one or more processors and memory for storing programs to be executed by the one or more processors. The first client device sends a request to access information at the server system without providing any user account information. In response to the information access request, the server system generates a unique identifier and returns the unique identifier to the first client device. The first client device then provides the unique identifier to a second client device. The second client device then sends a first message to the server system, the first message including information about a user account at the server system and the unique identifier. The first client device then receives information associated with the user account from the server system after the user account information and the unique identifier is authenticated by the server system.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
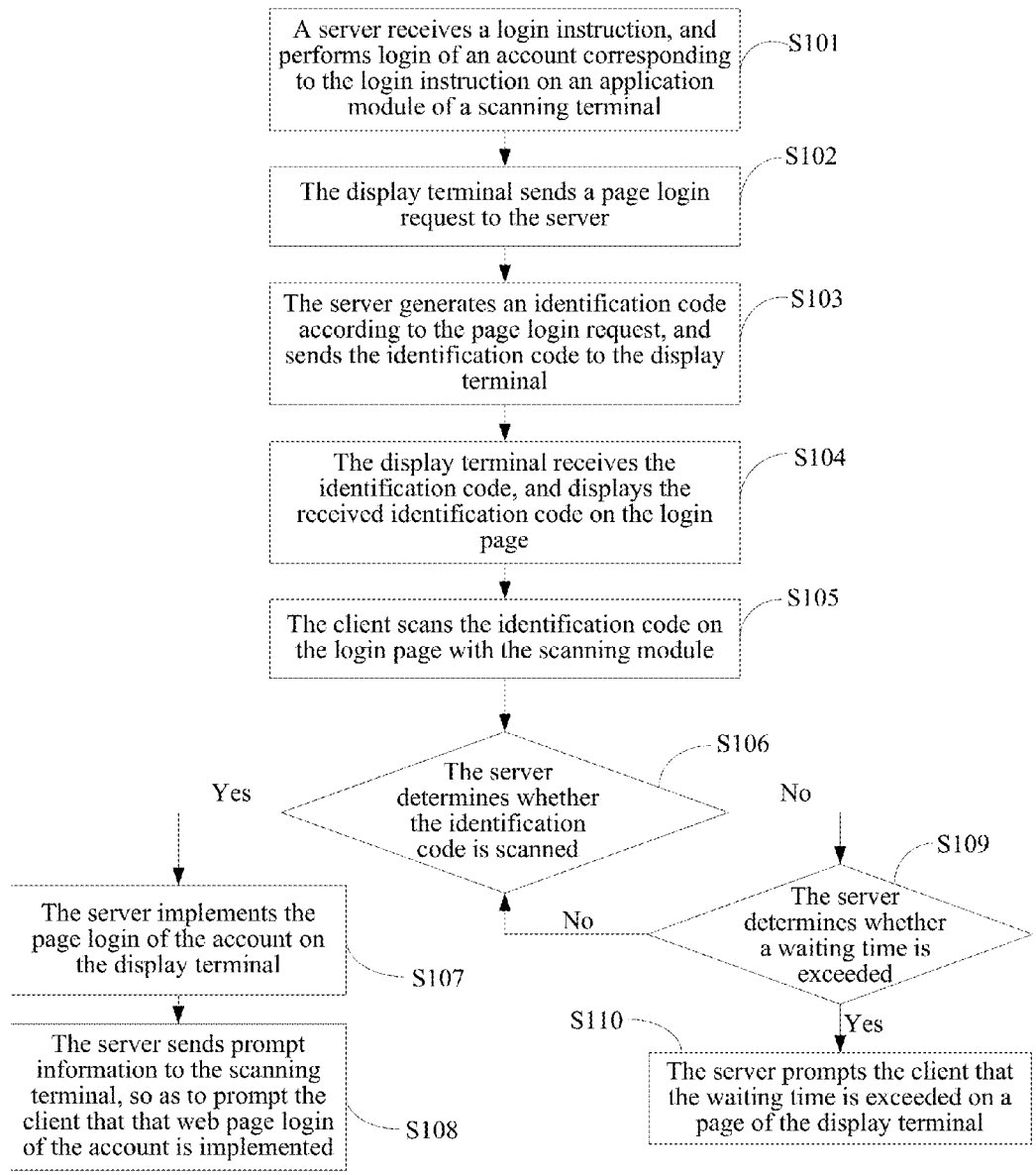
FIG. 1 is a schematic flow chart of a preferred implementation of a page login method provided in the present invention.

The description of the following implementations refers to the accompanying drawings, so as to illustrate specific implementations that may be implemented by the present invention. Direction terminologies mentioned in the present invention, such as "upper", "lower", "front", "rear", "left", "right", "inner", "outer", "side" are only used as reference of the direction of the accompany drawings. Therefore, the used direction terminology is only used to explain and understand the present invention, rather than to limit the present invention. In the figure, units with similar structures are represented in same reference numerals.

FIG. 1 is a schematic flow chart of a preferred implementation of a page login method provided in the present invention.

In Step S101, a server receives a login instruction input by a user, and performs login of an account corresponding to the login instruction on an application module of a scanning terminal, where the scanning terminal includes a scanning module.

For example, the scanning terminal is a mobile phone, and for example, the application module is an instant messaging module. For example, the instant messaging module is WeChat or QQ. Of course, the application module may also be in any other form, for example, the login to a web site on a mobile phone, which is not listed in detail herein. The application module, namely, the instant messaging module, has an identification code, and includes a scanning module, for example, a 2D code scanning module. When the application module is an instant messaging module such as WeChat or QQ, the instant messaging module is disposed with the scanning module, and when the application module is in the form of a web site, the web site also has the scanning module.

In a specific implementation process, after a user inputs an account and a password and requests to log in on an application module, the scanning terminal sends the account and the password input by the user to the server, and the server receives the account and the password, and determines, in a prestored authentication list, whether the account and the password match, if yes, controls the login of the account on the application module of the scanning terminal, and records a current login state of the account.

In Step S102, when the user opens a login page with the display terminal, the display terminal generates a page login request and sends the page login request to the server.

In a specific implementation process, two cases occur when a user opens a login page:

A). A user opens a web page on a display terminal, the display terminal sends a page access request to a server. After receiving the page access request, the server assigns an authentication identifier (Universally Unique Identifier, UUID) to the page access request, and the display terminal displays the web page for the user, where the page may include a login button.

When the user selects to open the login page through the login button on the web page, the display terminal generates a page login request and sends the page login request to the server, where the page login request includes the authentication identifier. Of course, the user may also open the login page in other manners.

B). A user directly inputs an identification code acquisition web address as the page login request, for example, directly inputs the identification code acquisition web address into an address bar of a browser in a display terminal, where through the identification code acquisition web address, an identification code may be directly acquired from the server.

In Step S103, the server receives the page login request, generates an identification code according to the page login request, and sends the identification code to the display terminal, where the identification code includes the authentication identifier.

The identification code in the present invention is preferably a 2D code, of course, it may also be the one-dimensional code or the three-dimensional code, or an identification code in any other form, which falls within the protection scope of the present invention, and is not listed in detail herein.

In Step S104, the display terminal receives the identification code, and displays the received identification code on the login page.

In Step S105, the user scans the identification code on the login page with the scanning module in the application module where login is performed of the scanning terminal.

Of course, in a specific implementation process, the scanning module may be also not disposed in the application module where login is performed, that is, the scanning module and the application module may be two independent modules in the scanning terminal, as long as the scanning module is associated with the account of which login is performed on the application module.

In a specific implementation process, after the scanning module scans the identification code, the scanning terminal generates scanning information at the same time and sends the scanning information to the server. In the scanning information, a one-to-one mapping exists between the account of which login is performed on the application module of the scanning terminal and the authentication identifier in the identification code.

In Step S106, the server determines whether the identification code is scanned, if yes, Step S107 is performed, and otherwise, Step S109 is performed.

The server presets a polling mechanism, that is, presets a search interval. For example, the search interval is 1 second (S), and the received scanning information is searched every second. If the authentication identifier corresponding to the identification code is found in the received scanning information, it is determined that the identification code is scanned, and otherwise, it is determined that the identification code is not scanned.

In Step S107, the server implements page login of the account on the display terminal.

In a specific implementation process, after determining that the identification code is scanned, the server acquires the account from scanning information corresponding to the authentication identifier in the identification code, and implements page login of the obtained account on the display terminal.

In Step S108, the server sends prompt information to the scanning terminal, the scanning terminal displays the prompt information in a display box of the application module. The prompt information is used to prompt the user the following information: the web page login of the account, of which login is performed on the application module of the scanning terminal is implemented, on the display terminal.

In a specific implementation process, after the web page login of the account, of which login is performed on the application module of the scanning terminal, is implemented on the display terminal, the display terminal further prompts the user whether to continue other relevant services on the page after login, for example, microblogging.

In Step S109, the server determines whether time shown in the identification code exceeds a waiting time, for example, the waiting time is 20 seconds, if yes, Step S110 is performed, and otherwise, Step S106 continues to be performed.

In Step S110, the server prompts, on a page of the display terminal, the user that the waiting time is exceeded, and the user selects whether to continue to stay in the page of the current identification code or enter other pages.

When the application module is WeChat, the identification code is a 2D code, the scanning terminal is a mobile phone, and the display terminal is a computer, the working principle of the present invention is illustrated as follows.

After WeChat is opened on a mobile phone, a user inputs an account and a password to log in to WeChat. For example, the account is "123456"; after authenticating that the account and the password match, a WeChat server enables the login of the account "123456" in WeChat on the mobile phone, and the user performs a corresponding operation on the mobile phone through WeChat, for example, selects a friend to chat. WeChat includes an application program for scanning a 2D code, login to WeChat on a mobile phone may be performed over a wireless network, or over a network provided by a mobile operator, for example, a global system of mobile communication (Global System of Mobile communication, GSM) network.

Subsequently, the user inputs a web address (that is, the identification code acquisition web address) of a WeChat login page on a computer, the computer sends a page login request to the WeChat server over the Internet. After receiving the page login request, the WeChat server generates a 2D code and sends the 2D code to the computer, and the computer displays the 2D code in the WeChat login page, where the 2D code includes an authentication identifier "ABC", and the authentication identifier "ABC" may be sent at the time when the computer sends the page login request.

The user opens the application program for scanning a 2D code in WeChat on the mobile phone, and scans the 2D code displayed on the WeChat login page on the computer through the application program. When scanning the 2D code, the mobile phone further generates scanning information and sends the scanning information to the WeChat server. In the scanning information, a one-to-one mapping exists between the account "123456" and the authentication identifier "ABC" in the 2D code.

The WeChat server searches the received scanning information, if the authentication identifier "ABC" is found, it is determined that the 2D code corresponding to the authentication identifier "ABC" is scanned, and the WeChat server implements page login of the account "123456" corresponding to "ABC" on the computer.

Of course, if the application module in the present invention is a web site, for example, a shopping web site, the user inputs the account and the password to log in to the shopping web site on the mobile phone. When the user finds a 2D code of an object on a computer or other outdoor display screens, the user may directly scan the 2D code through a scanning program in the shopping web site where login is performed on the mobile phone, so as to implement page login of the account at the web site corresponding to the object, and perform shopping or other operations.

Obviously, in the page login method provided in the present invention, after the user has logged in on the scanning terminal and performs page login at other display terminals (for example, a display screen that can be connected to the Internet), an account and a password do not require to be input again, the scanning module in the scanning terminal may directly scan the 2D code displayed on other display terminals, so as to implement page login on other display terminals. The speed is fast, the efficiency is high, the login manner is simple, phishing operations can be effectively prevented, thereby improving the security of the account and the password, and guaranteeing the security of the account.

Figure 2:
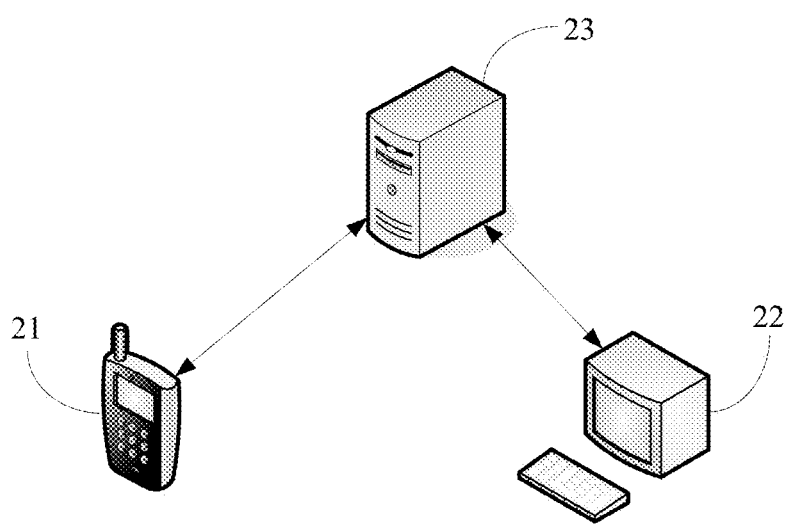
FIG. 2 is a schematic structural diagram of a preferred implementation of a page login system provided in the present invention.

Referring to FIG. 2, FIG. 2 is a schematic structural diagram of a page login system in the present invention, where the system includes a scanning terminal 21, a display terminal 22, and a server 23.

The scanning terminal 21 has an application module, for example, WeChat. The application module has a scanning module. In a specific application process, a user inputs an account and a password as a login instruction, the scanning terminal 21 sends the login instruction to the server 23, and the server 23 authenticates whether the account and the password included in the login instruction match, if yes, the login of the account is performed on the application module of the scanning terminal 21, that is, the login to WeChat is performed.

When the user opens a login page on the display terminal 22, the display terminal 22 sends a page login request to the server 23 over the Internet. For example, the user directly inputs an identification code acquisition web address in a browser of the display terminal 22 to open the login page.

The server 23 generates an identification code according to the received page login request, and sends the generated identification code to the display terminal 22. The display terminal 22 displays the received identification code on the login page. The identification code includes an authentication identifier.

The user scans the identification code with the scanning module in the application module of the scanning terminal 21, and the scanning terminal 21 generates scanning information and sends the scanning information to the server 23 at the same time, where the scanning information includes a one-to-one mapping between the account to which the user logs in on the scanning terminal 21 and the authentication identifier in the identification code.

The server 23 determines whether the identification code sent to the display terminal is scanned. Specifically: the server 23 searches the received scanning information to find whether the authentication identifier exists, and if the authentication identifier is found, determines that the identification code is scanned. After it is determined that the identification code sent to the display terminal is scanned, the server 23 implements page login of the account on the display terminal 22.

In a specific implementation process, the server 23 also presets a search interval, for example, 1 second, and periodically searches the received scanning information according to the search interval, so as to determine whether the authentication identifier corresponding to the identification code exists in the received scanning information.

In the present invention, the identification code is preferably a 2D code, and of course, may also be a 1D code or a 3D code, or an identification code in any other form, which falls within the protection scope of the present invention.

For a detailed working process of a page login system provided in the present invention, reference may be made to the description of the page login method for instant messaging, which is not repeated herein.

Figure 3:
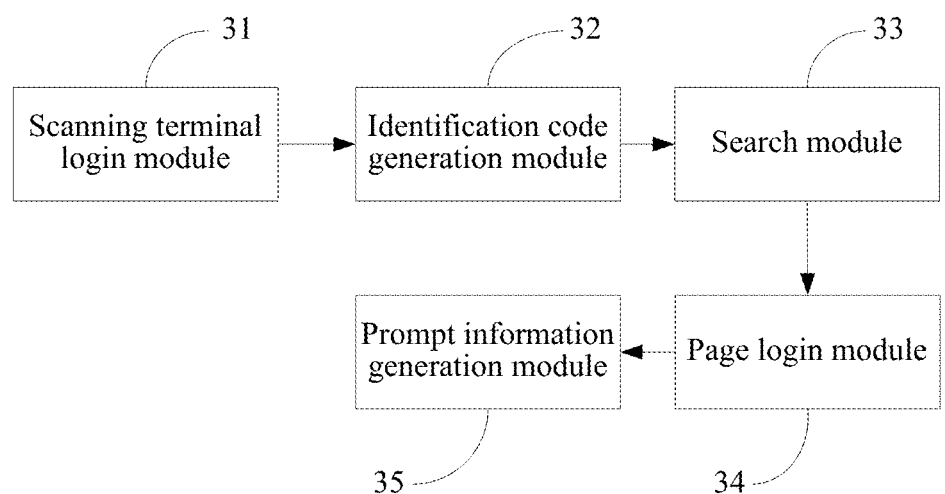
FIG. 3 is a schematic structural diagram of a preferred implementation of a server provided in the present invention.

Referring to FIG. 3, FIG. 3 is a schematic structural diagram of a preferred implementation of a server provided in the present invention.

The server includes a scanning terminal login module 31, an identification code generation module 32, a search module 33, a page login module 34, and a prompt information generation module 35.

The scanning terminal login module 31 receives a login instruction input by a user, where the login instruction includes an account and a password, and after it is determined that the account and the password input by the user match, implements login of the account on an application module of the scanning terminal, where the scanning terminal includes a scanning module.

The identification code generation module 32 generates an identification code after a page login request sent by the display terminal is received, and sends the identification code to the display terminal, where the identification code includes an authentication identifier.

In a specific implementation process, the identification code generation module 32 is further configured to, after a page access request sent by the display terminal is received, assign the authentication identifier to the page access request, and send the authentication identifier to the display terminal; and after the page login request sent by the display terminal and the authentication identifier are received, generate the identification code according to the page login request and the authentication identifier.

The search module 33 periodically searches the received scanning information according to a preset search interval, so as to determine whether the authentication identifier corresponding to the identification code is found. The scanning information is generated by the scanning terminal scanning the identification code, and the scanning information includes a one-to-one mapping between the account and the authentication identifier in the identification code.

When finding the authentication identifier corresponding to the identification code, the search module 33 determines that the identification code is scanned, so that the page login module 34 acquires, from the scanning information, an account corresponding to the authentication identifier, and implements page login of the account on the display terminal.

After the page login module 34 implements page login of the account on the display terminal, the prompt information generation module 35 generates prompt information and sends the prompt information to the scanning terminal, so as to display the prompt information on the scanning terminal, where the prompt information is used to prompt the user that page login of the account is performed on the display terminal.

In the present invention, the identification code is preferably a 2D code, and of course, may also be a 1D code or a 3D code, or an identification code in any other form. The application module is preferably an instant messaging module, for example, WeChat. Of course, it may also be a module in any other form, for example, a web site.

For a detailed working procedure of the server provided in the present invention, reference may be made to the description of the page login method, which is not repeated herein.

In the present invention, the server receives the login instruction input by the user, and performs login of the account corresponding to the login instruction on the application module of the scanning terminal, where the scanning terminal includes the scanning module; and the server determines whether the identification code displayed on the display terminal is scanned by the scanning terminal corresponding to the account, if yes, implements page login of the account on the display terminal. It is obvious that in the present invention, during page login, not only the operation is simple, the efficiency is high, but also an account and password do not require to be input, thereby guaranteeing the security of the account.

Figure 4:
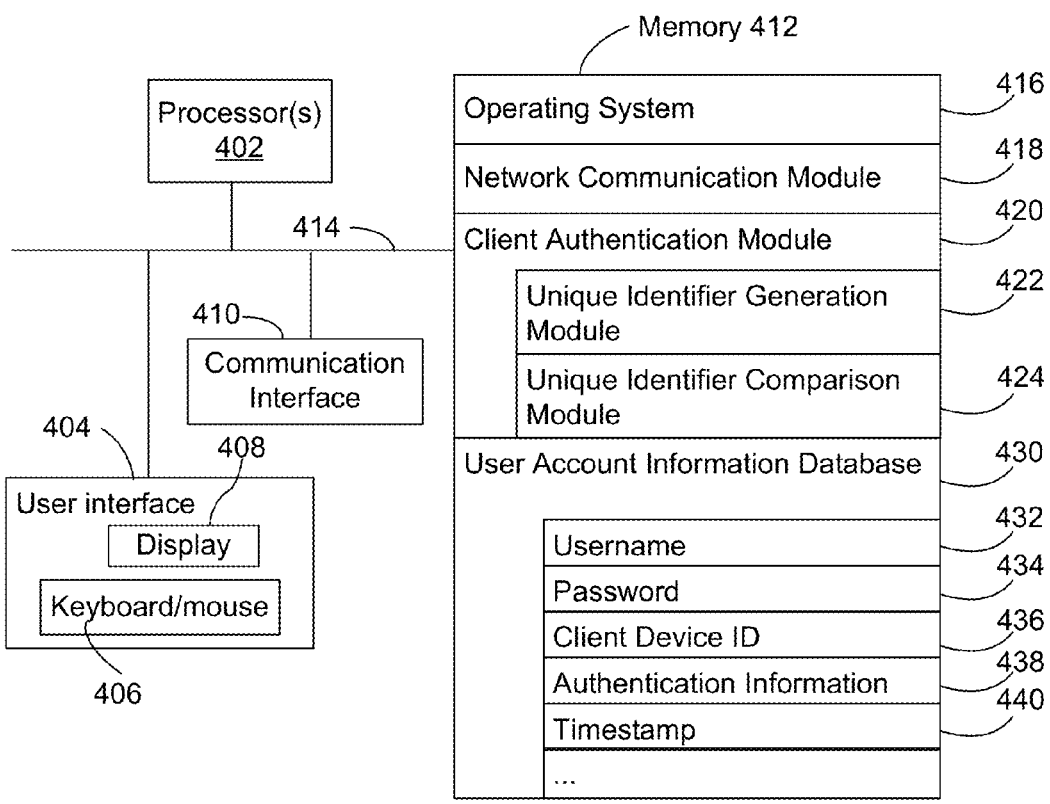
FIG. 4 is a schematic structural diagram of components of a server system for authenticating a user's access request from a client device in accordance with some implementations of the present application.

FIG. 4 is a schematic structural diagram of components of a server system for authenticating a user's access request from a client device in accordance with some implementations of the present application. The server system 23 includes one or more processors 402 for executing modules, programs and/or instructions stored in memory 412 and thereby performing predefined operations; one or more network or other communications interfaces 410; memory 412; and one or more communication buses 414 for interconnecting these components. In some implementations, the server system 23 includes a user interface 404 comprising a display device 408 and one or more input devices 406 (e.g., keyboard or mouse). In some implementations, the memory 412 includes high-speed random access memory, such as DRAM, SRAM, or other random access solid state memory devices. In some implementations, memory 412 includes non-volatile memory, such as one or more magnetic disk storage devices, optical disk storage devices, flash memory devices, or other non-volatile solid state storage devices. In some implementations, memory 412 includes one or more storage devices remotely located from the processor(s) 402. Memory 412, or alternately one or more storage devices (e.g., one or more nonvolatile storage devices) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a network communications module 418 that is used for connecting the server system 23 to other computers (e.g., the client devices 21 and 22 in FIG. 2) via the communication network interfaces 410 and one or more communication networks (wired or wireless), such as the Internet, other wide area networks, local area networks, metropolitan area networks, etc.;
- a client authentication module 420 for authenticating an information access request from a client device, further including a unique identifier generation module 422 for generating a unique identifier (e.g., a 2D bar code such as a QR code) in response to the information access request and a unique identifier comparison module 424 for comparing authentication information from a client device (e.g., the client device 21 in FIG. 2) with a unique identifier; and
- a user account information database 430 including a plurality of login entries, each login entry including a pair of username 432 and password 434, a client device ID 436 identifying a client device that provides the username 432 and password 434, authentication information 438 associated with a user account, a timestamp 440 indicating when the authentication information 438 was generated, and other information such as an ID of a network that the client device connects to.

Figure 5:
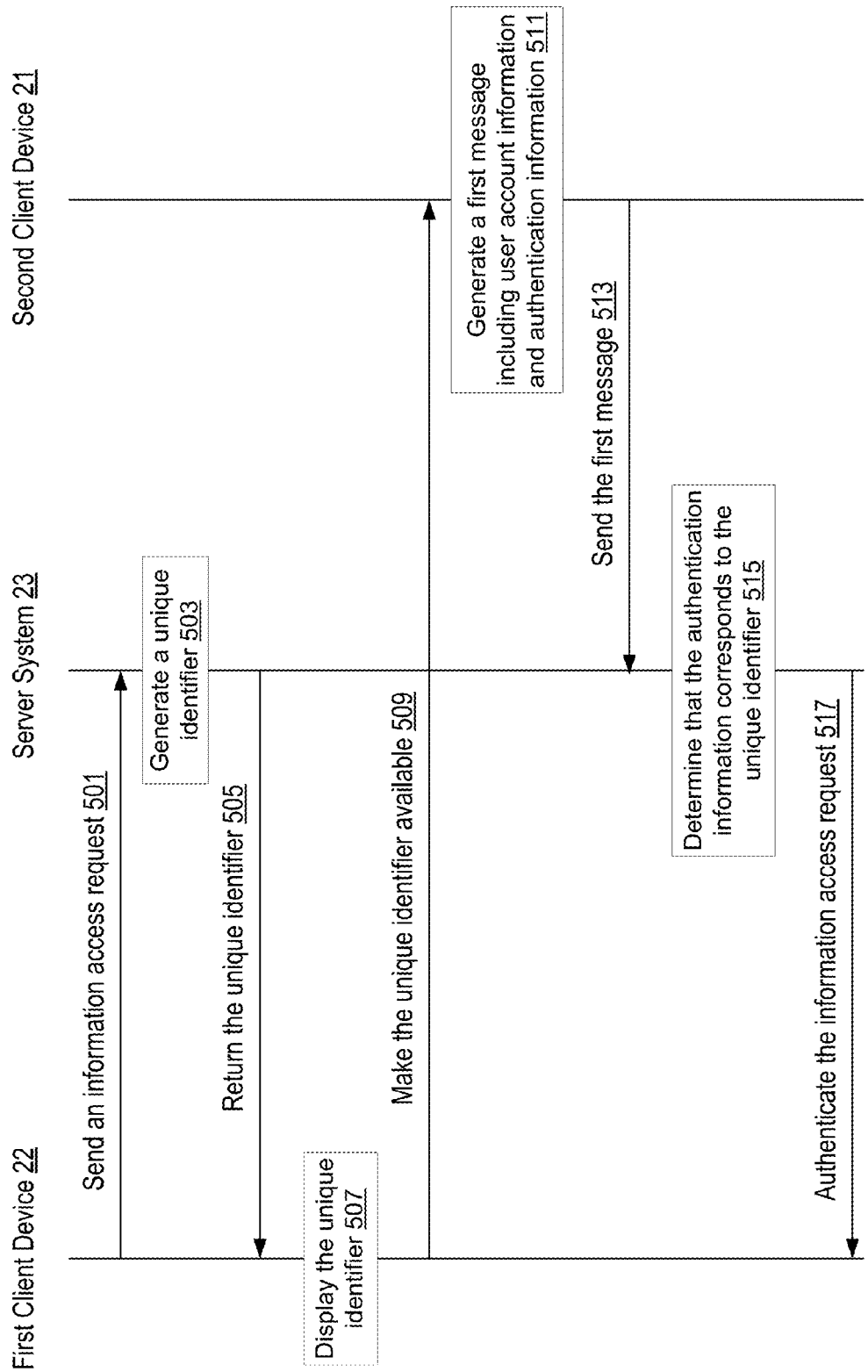
FIG. 5 is a flow chart illustrating how the server system authenticates a user's access request from a client device in accordance with some implementations of the present application.

FIG. 5 is a flow chart illustrating how the server system authenticates a user's access request from a client device in accordance with some implementations of the present application. In this example, the first client device 22 sends (501) an information access request to the server system 23. The information access request may be triggered, for example, when the user of the first client device 22 clicks on a sign-in button in an account sign-in webpage or when the user clicks on a link to access information associated with another user account.

In response to the information access request from the first client device 22, the server system 23 generates (503) a unique identifier and returns (505) the unique identifier to the first client device 22. As explained above, the unique identifier, which may be a 1D bar code, a 2D bar code, or a 3D bar code, is to be displayed (507) on a display of the first client device 22. Moreover, the unique identifier includes authentication information generated by the server system 23 for the information access request. The authentication information may be generated with any type of data and encoded in the unique identifier. For example, the authentication information may be a string of alphanumerical characters, logograms such as Chinese or Japanese Kanji characters, binary codes, an image, a URL (Uniform Resource Locator), etc.

After receiving the unique identifier displayed on the display of the first client device 22, the user has multiple options to make (509) the unique identifier available to the second client device 21. As described above, if the user already logs into his or her account from the second client device 21 (e.g., a smartphone), the user may invoke an application in the smartphone to scan the unique identifier through a built-in camera of the smartphone. Alternatively, the user may operate the first client device 22 to send an electronic copy of the unique identifier to the second client device 21 using various electronic mailing or messaging applications, e.g., a messaging application like WeChat or Facebook Messenger.

In either case, the second client device 21 generates (511) a first message. In some implementations, the first message includes user account information at the server system and authentication information. The user account information (e.g., an encrypted pair of username and password or a session identifier) may include information saved locally at the client device as well as information provided by the server system 23 when the user logs into his or her account from the second client device 21. The authentication information (e.g., a string of alphanumerical characters) is extracted from the unique identifier by the second client device through scanning the unique identifier.

Upon receipt of the first message from the second client device 21 (513), the server system determines whether the authentication information corresponds to the unique identifier generated by the server system. For example, if the authentication information extracted from the unique identifier by the second client device 21 is the same as the authentication information encoded into the unique identifier (515), the server system 23 then authenticates (517) the information access request such that the user can access information at the server system and associated with the user account information.

In some implementations, as noted above, before receiving the information access request from the first client device 22, the server system 23 already receives a login request from the second client device 21, the login request including a username and a password and then generates a login entry at the server system if the username and the password match a user account at the server system. As shown in FIG. 4, the login entry may include identification information associated with the user account (e.g., username and password) and identification information associated with the second client device (e.g., the client device ID). One reason for including the identification information associated with the second client device 21 is to prevent other users from accessing this user's account by, e.g., scanning the unique identifier. By requiring the identification information in the first message, the server system can check whether the first message includes the same identification information associated with the second client device 21 and, if not, denies the information access request.

As noted above, the first and second client devices may be at the same physical location. In this case, the authentication information in the first message may be generated in the second client device by the user of the second client device scanning the unique identifier on the display of the first client device. In some other implementations, the first and second client devices may be at two different physical locations. For example, a first person may want to share some personal information of his or her own stored at the server system 23 with a second person for a short time period. In this case, the authentication information in the first message is generated by: the first client device sending a second message (e.g., an email) to the second client device, the second message including an electronic copy of the unique identifier; and the second client device extracting the authentication information from the electronic copy of the unique identifier and including the authentication information in the first message. But since the first person never provides his or her username and password to the second person, the server system may terminate the second person's access to the first person's personal information after the authentication information associated with the second person and stored in the user account information database has been generated for more than a predefined time period measured by the timestamp.

In some implementations, after authenticating the information access request, the server system 23 generates a webpage using the information associated with the user account information and returns the webpage to the first client device to be displayed on the display of the first client device. Similarly, after authenticating the information access request, the server system 23 may generate an alert message, the alert message indicating that there is another access to the information associated with the user account information, and returns the alert message to the second client device to be displayed on a display of the second client device.

In some implementations, the server system 23 receives a client-visit request (e.g., a request to an account sign in webpage) from the first client device 22 before receiving the information access request (e.g., a sign in attempt). In response to the client-visit request, the server system 23 generates a client-visit verification identifier (e.g., UUID) and returns the client-visit verification identifier to the first client device 22. The first client device 22 then includes the client-visit verification identifier in the information access request to be sent to the server system 23. For example, the server system includes at least a portion of the client-visit verification identifier in the unique identifier and then checks whether the authentication information includes the portion of the client-visit verification identifier when determining whether or not to authenticate the information access request.

In sum, the present invention is disclosed with the preferred implementations in the foregoing, but the preferred implementations are not intended to limit the present invention. Various variations and modifications made by persons of ordinary skill in the art without departing from the spirit and the scope of the present invention fall within the scope of the present invention. Therefore, the protection scope of the present invention is subject to the appended claims.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A page login method comprising:
    a server receiving a user account and a password from a user of a mobile device and,
    after confirming that the user account and the password match each other, the server storing the user account at a login module of the mobile device, the mobile device further including a scanning module;
    the server receiving a page access request from a computer;

in response to the page access request, assigning an authentication identifier to the page access request and returning the authentication identifier to the computer;

the server receiving a generic page login request from the computer, generating a first identification code according to the generic page login request and returning the first identification code to the computer, wherein the page login request includes the authentication identifier;

the server receiving a second identification code from the mobile device, wherein the second identification code is generated by the mobile device by scanning the first identification code displayed on the computer using the scanning module; and the server returning a page including data associated with the user account to the computer when the second identification code is the same as the first identification code.

2. The method of claim 1, wherein the first identification code includes an authentication identifier and the step of the server returning a page including data associated with the user account to the computer when the second identification code is the same as the first identification code further includes:

the server receiving scanning information sent by the mobile device, wherein the scanning information is generated by the mobile device scanning the first identification code displayed by the computer, and the scanning information includes a one-to-one mapping between the user account and the authentication identifier in the first identification code; and the server searching the received scanning information for the authentication identifier corresponding to the first identification code and determining that the first identification code is scanned when the authentication identifier exists in the received scanning information.

3. The method of claim 2, further comprising:

before the server searching the received scanning information for the authentication identifier corresponding to the first identification code:

the server presetting a search interval;

the server periodically searching the received scanning information according to the search interval; and the server determining whether the authentication identifier corresponding to the first identification code exists in the received scanning information.

4. The method of claim 2, wherein the step of the server returning a page including data associated with the user account to the computer when the second identification code is the same as the first identification code further includes:

the server retrieving, from the scanning information, the user account corresponding to the authentication identifier according to the one-to-one mapping; and the server authenticating the generic page login request of the user account from the computer and returning the page including data associated with the user account to the computer.

5. The method of claim 2, wherein the step of the server generating the first identification code according to the generic page login request further includes:

the server receiving a generic page access request sent by the computer, assigning the authentication identifier to the generic page access request, and sending the authentication identifier to the computer; and the server receiving the generic page login request sent by the computer, wherein the generic page login request carries the authentication identifier, and generating the identification code according to the generic page login request and the authentication identifier, wherein the identification code includes the authentication identifier.

6. The method of claim 1, further comprising:

after the server returning a page including data associated with the user account to the computer when the second identification code is the same as the first identification code:

the server generating prompt information and sending the prompt information to the mobile device so as to display the prompt information on the mobile device, wherein the prompt information is used to prompt the user that the generic page login request is performed on the computer into the user account.

7. The method of claim 1, wherein the identification code is a 2D bar code.

8. The method of claim 1, further comprising:

after the server receiving the second identification code from the mobile device:

the server receiving a third identification code from a second mobile device associated with a second user account, wherein the second identification code is generated by the second mobile device by scanning the first identification code displayed on the computer using a scanning module in the second mobile device;

the server generating prompt information in accordance with a determination that there is an existing one-to-one mapping between the user account and the first identification code; and the server sending the prompt information to the second mobile device so as to display the prompt information on the second mobile device, wherein the prompt information is used to prompt the user that the generic page login request is not performed on the computer into the second user account associated with the second mobile device.

9. The method of claim 1, wherein the authentication identifier is a Universally Unique Identifier (UUID).

10. A server comprising:

a scanning terminal login module that receives a user account and a password from a user of a mobile device and, after confirming that the user account and the password match each other, store the user account at a login module of the mobile device, the mobile device further including a scanning module;

an identification code generation module that receives a page access request from a computer, in response to the page access request, assigns an authentication identifier to the page access request and returns the authentication identifier to the computer;

the identification code generation module receives a generic page login request from a computer, generates a first identification code according to the generic page login request and returning the first identification code to the computer, wherein the page login request includes the authentication identifier;

the identification code generation module receives a second identification code from the mobile device, wherein the second identification code is generated by the mobile device by scanning the first identification code displayed on the computer using the scanning module; and a page login module that returns a page including data associated with the user account to the computer when the second identification code is the same as the first identification code.

11. The server of claim 10, wherein the first identification code includes an authentication identifier and the server further including:

a search module that receives scanning information sent by the mobile device, searches the received scanning information for the authentication identifier corresponding to the first identification code, and determine that the first identification code is scanned when the authentication identifier exists in the received scanning information, wherein the scanning information is generated by the mobile device scanning the first identification code, and the scanning information includes a one-to-one mapping between the user account and the authentication identifier in the first identification code.

12. The server of claim 11, wherein the search module periodically searches the received scanning information according to a preset search interval.

13. The server of claim 11, wherein the page login module retrieves, from the scanning information, a user account corresponding to the authentication identifier according to the one-to-one mapping; and authenticate the generic page login of the user account from the computer and returning the page including data associated with the user account to the computer.

14. The server of claim 10, further comprising:
an identification code generation module that receives a generic page login request sent by the computer, generates the first identification code according to the generic page login request, and send the first identification code to the computer.

15. The server of claim 10, further comprising:
a prompt information generation module-that generates prompt information, and sends the prompt information to the mobile device, so as to display the prompt information on the mobile device, wherein the prompt information is used to prompt the user that the page login is performed on the computer into the user account.

16. The server of claim 15, wherein, after the server receives the second identification code from the mobile device, the server receives a third identification code from a second mobile device associated with a second user account, wherein the second identification code is generated by the second mobile device by scanning the first identification code displayed on the computer using a scanning module in the second mobile device, and the prompt information generation module generates prompt information in accordance with a determination that there is an existing one-to-one mapping between the user account and the first identification code and sends the prompt information to the second mobile device so as to display the prompt information on the second mobile device, wherein the prompt information is used to prompt the user that the generic page login request is not performed on the computer into the second user account associated with the second mobile device.

17. The server of claim 10, wherein the identification code is a 2D bar code.

* * * * *